(12) United States Patent
Dattel

(10) Patent No.: US 6,485,561 B1
(45) Date of Patent: Nov. 26, 2002

(54) LOW DENSITY CELLULAR CONCRETE WITH ACCELERATORS FOR RAPID HARDENING

(76) Inventor: Clinton D. Dattel, 11914 W. 61st. Ave., Arvada, CO (US) 80004

( * ) Notice: Subject to any disclaimer, the term of this patent is extended or adjusted under 35 U.S.C. 154(b) by 0 days.

(21) Appl. No.: 09/798,643

(22) Filed: Mar. 2, 2001

Related U.S. Application Data

(60) Provisional application No. 60/186,813, filed on Mar. 3, 2000.

(51) Int. Cl.[7] .................................................. C04B 7/13
(52) U.S. Cl. ........................ 106/679; 106/672; 106/677; 106/709; 106/724; 106/DIG. 1
(58) Field of Search ................................ 106/672, 677, 106/679, 709, 724, DIG. 1

(56) References Cited

U.S. PATENT DOCUMENTS

| | | | |
|---|---|---|---|
| 3,141,857 A | | 7/1964 | Sommer ...................... 260/2.5 |
| 3,758,319 A | * | 9/1973 | Ergene ........................ 106/646 |
| 3,867,159 A | * | 2/1975 | Ergene ........................ 106/646 |
| 3,878,278 A | * | 4/1975 | Miller et al. ................. 264/228 |
| 3,963,507 A | * | 6/1976 | Kuramoto et al. .......... 106/674 |
| 4,444,593 A | | 4/1984 | Schutz .......................... 106/89 |
| 4,501,830 A | | 2/1985 | Miller et al. ................. 523/401 |
| 4,595,710 A | | 6/1986 | Albertelli et al. ........... 521/100 |
| 4,741,782 A | * | 5/1988 | Styron ........................ 106/122 |
| 4,843,103 A | | 6/1989 | Albertelli et al. ............. 521/83 |
| 4,871,283 A | | 10/1989 | Wright ........................ 405/263 |
| 5,207,830 A | | 5/1993 | Cowan et al. ............... 106/672 |
| 5,372,641 A | | 12/1994 | Carpenter .................... 106/714 |
| 5,595,596 A | * | 1/1997 | Marcotullio et al. ........ 106/677 |
| 5,728,209 A | | 3/1998 | Bury et al. .................. 106/819 |
| 5,759,259 A | | 6/1998 | Sychra et al. ............... 106/659 |
| 6,200,379 B1 | | 3/2001 | Strabala ...................... 106/705 |

FOREIGN PATENT DOCUMENTS

| | | | |
|---|---|---|---|
| EP | 204370 | * | 12/1986 |
| JP | 56-155061 | * | 12/1981 |
| JP | 6-211579 | * | 8/1994 |
| WO | 97/19032 | * | 5/1997 |

OTHER PUBLICATIONS

Derwent Abstract No. 1990–326327, abstract of Soviet Union Patent Specification No. 1530670 (Dec. 1989).*

Gecko Stone Tessellated Interlocking Pavers, Lightweight Concrete Houses, Architectural . . . ; Introducing the new GeckoStone™ 2000; http://www.geckostone.com (No Month).

GeckoStone™ Lightweight Composite Concrete; http://www.geckostone.com/lwc.html (1997) (No Month).

GeckoStone™; Addressing the Need for Permanent Shelter in Hawaii, Shelter Overview; http://www.geckostone.com/permanent.html (1993) (No Month).

GeckoStone™; Addressing the Need for Permanent Shelter in Hawaii, Options for Residential Construction in Hawaii; http://www.geckostone.com/options.html (1993) (No Month).

GeckoStone™; Addressing the Need for Permanent Shelter in Hawaii, Evaluating Wood, Steel, Concrete and LWC Structures; http://www.geckostone.com/comparing.html (1993) (No Month).

GeckoStone™; Addressing the Need for Permanent Shelter in Hawaii, Advantages of Lightweight Composite over Regular Concrete; http://www.geckostone.com/advantages.html (1999) (No Month).

GeckoStone™; Addressing the Need for Permanent Shelter in Hawaii, Examining the Resistance to Change; http://www.geckostone.com/resistance.html (1993) (No Month).

GeckoStone™; Addressing the Need for Permanent Shelter in Hawaii, Architectural Style: Choices and Challenges; http://www.geckostone.com/architecturalstyle.html (1993) (No Month).

GeckoStone™; Addressing the Need for Permanent Shelter in Hawaii, Shelter Summary; http://www.geckostone.com/summary.html (1993) (No Month).

* cited by examiner

*Primary Examiner*—Anthony J. Green
(74) *Attorney, Agent, or Firm*—Sheridan Ross P.C.

(57) ABSTRACT

Compositions and methods are provided for creating a low density cellular concrete that has a viscosity which rapidly increases after adding an accelerator, while maintaining substantially the same density. The initial components include a cement, water, a surfactant to create a foam, and an accelerator such as sodium carbonate. The accelerator serves to rapidly increase the viscosity of the mixture, thereby entrapping the foam or air within the matrix of the mixture before air can escape. An additional embodiment includes using a byproduct such as fly ash in the composition to further reduce costs and make an environmentally friendly product.

20 Claims, 1 Drawing Sheet

LOW DENSITY CELLULAR CONCRETE WITH ACCELERATORS FOR RAPID HARDENING

CROSS-REFERENCE TO RELATED APPLICATIONS

The present application claims priority under 35 U.S.C. §119(e) from U.S. Provisional Patent Application Serial No. 60/186,813, filed Mar. 3, 2000. Provisional Application Serial No. 60/186,813, is incorporated herein by reference in its entirety.

FIELD OF THE INVENTION

The present invention relates to compositions and methods of making concrete, mortar and grout, and more specifically low density cellular concretes which harden in an accelerated period of time.

BACKGROUND OF THE INVENTION

Cementitious products such as concrete, grout and mortar are commonly used materials which are critical to the construction industry. The materials have almost limitless uses including the construction of highways, building foundations, brickwork, and oilfield well-bore applications, to name a few. These cementitious products almost all combine at minimum a mixture of a lime cement material which is mixed with water. Other common ingredients may include sand, fly ash, silica fume, or cenospheres, to name a few.

Cellular concretes are cementitious products which are characterized by a much lower density than typical concrete, which results from air bubbles being entrained within the concrete during hardening. These low density concretes sustain impressive compressive forces, yet at significantly reduced weights, thus making the material ideal for use in roofs, above grade flooring materials and in conditions where high density concretes create soil settling problems.

Cellular concretes are typically made by mixing a foam with a cement slurry, the foam being made out of certain proteins such as ground chicken feathers and other chemical protein compositions including soaps to create a low density slurry. As the concrete cures, the air bubbles in the foam become trapped, this reducing the density of the concrete. Another method of making cellular concrete utilizes an "autoclaved" method where aluminum powders are put in a mold with lime concrete and water, thus creating a chemical reaction which creates hydrogen bubbles within the concrete slurry. The hydrogen bubbles are subsequently trapped during the hardening of the concrete, thus making the concrete less dense.

Unfortunately, manufacturing cellular concretes using various forms of proteins or with the autoclaved process can be expensive, time consuming and requiring specialized materials and equipment. Additionally, it typically takes a significant period of time for the cellular concrete to set, thus making it impractical for numerous commercial and industrial applications. Thus, it would be extremely beneficial and useful to have a composition and method for manufacturing cellular concretes which utilizes commonly known materials, is inexpensive and which significantly accelerates the curing process, and consequently shortens the time required for the cellular concrete to cure.

SUMMARY OF INVENTION

It is thus an object of the present invention to provide a composition and method for making a low density cellular concrete utilizing inexpensive materials and equipment. Thus, the materials must be readily available, non-toxic, not dangerous to handle, and stable during the manufacturing of the cellular concrete. It is a further object that the materials can be mixed on-site or off-site with conventional cement mixing equipment, and thus allows the cellular concrete to be made at remote locations where building materials are required. One particular application would be where temporary shelters are required as a result of catastrophes resulting from hurricanes, tornados, war or other disasters. The invention disclosed herein allows for production of an economical, thermally efficient, environmentally friendly, fire-resistant building material.

It is a further object of the present invention to provide a concrete material which is capable of rapidly changing viscosity during hardening, while the density remains substantially the same. Thus, in a preferred embodiment, the cellular concrete mixture can be prepared and poured in a liquid state. However, after introducing the accelerator, which is typically a sodium carbonate or sodium bicarbonate material (baking soda), the viscosity of the cellular concrete changes rapidly to a non-liquid state which cannot be poured from a 3 inch diameter by 6 inch tall cylinder mold by means of gravity. Alternative accelerators which could be used for the same purpose include all metal carbonates or metal bicarbonates, including sodium, lithium, potassium, calcium and magnesium.

It is yet another object of the present invention to provide a low density cellular concrete which utilizes power plant waste materials, and more specifically, fly ash. By utilizing an otherwise waste product, a low density cellular concrete can be made which has superior strength and is cost effective and environmentally friendly.

Thus, in one aspect of the present invention, the following materials are used in combination to create a low density cellular concrete:

1. Lime cement;
2. Water, either fresh or brine;
3. Non-ionic foam surfactant; and
4. Sodium carbonate or sodium bicarbonate accelerator.

Alternatively, sand, fly-ash, silica fume, particles, cenospheres or further materials could be used in conjunction with the aforementioned components. The foam may be produced from proteins such as ground chicken feathers and other chemical protein compositions including soaps, with a non-ionic surfactant considered a preferred material, for example, Surfonic SF 95.

Type F DSI or FGD fly ash generated as a byproduct of burning coal has also been found to be an acceptable mix ingredient. Fly ash is residue that results from the combustion of ground or powdered coal and is removed from the stack gasses with various types of air quality control equipment. Fly ash is a pozzolan: a siliceous material which, in the presence of water, will chemically combine with lime (calcium oxide) to produce a cementitious material with excellent structural properties. It has be found that about 22% by weight fly ash can be used to create a cellular concrete mix with compressive strengths similar to autoclave structural blocks used in building construction applications. Furthermore, 50% fly ash by weight has been used to create a backfill material.

In another aspect of the invention, a method is provided for manufacturing the cellular concrete material. In this process, it is critical that the cement and water are mixed first and then combined with a pre-mixed foam comprising water and preferably a non-ionic surfactant. Once the cement and foam are completely mixed, the accelerator is added to the cellular concrete mixture.

BRIEF DESCRIPTION OF THE DRAWINGS

For a more complete understanding of the present invention and for further advantages thereof, reference is made to the following detailed description taken in conjunction with the accompanying drawings, in which.

DETAILED DESCRIPTION

The present invention relates to the composition and method of making cellular concretes using accelerators which rapidly increases the speed in which the cellular concrete cures. In a preferred embodiment, the accelerator is a sodium carbonate material or sodium bicarbonate (baking soda). Alternatively, metal carbonates and metal bicarbonates such as sodium, lithium, calcium or magnesium are believed to accomplish the same purpose, as well as various combinations of sodium carbonate, sodium bicarbonate and the aforementioned metal carbonate and metal bicarbonates. To create the cellular concrete with an accelerated setting time, essentially the following components are necessary: (1) lime cement; (2) water, either fresh or brine; (3) a foam surfactant, preferably non-ionic such as SF-95 or other commonly known surfactants such as tergitol NPG; and (4) a sodium carbonate or sodium bicarbonate accelerator.

Figure 1:
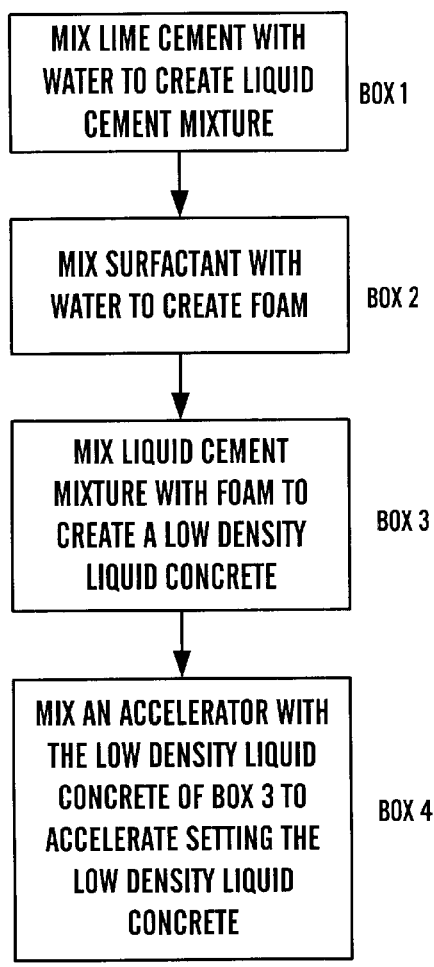
FIG. 1 is a flowchart depicting the various steps associated with mixing a lightweight cellular concrete where the accelerator is added last; and, FIG. 2 is a flowchart depicting alternate steps associated with mixing a lightweight cellular concrete where the accelerator is blended in dry form with other dry ingredients prior to mixing with wet components.

To prepare a composition of the cellular concrete, as shown in Box 1 of FIG. 1, generally about 1 part water is mixed with 3 parts ASTM C-150 Portland cement and mixed with an electric wand, cement mixer, etc. until the cement is completely mixed with the water. As depicted in Box 2, a foam is then formed by mixing approximately 3 parts of a non-ionic surfactant, such as SF-95, with 100 parts water using a high speed drill or auger, or aerated with compressed air until a foam is created. In the next step as depicted in Box 3, the foam is then added to the cement mixture and mixed thoroughly to produce a product having a density of between about 5 lb/ft³–120 lb/ft³. Finally, as shown in Box 4, after the foam and concrete is mixed together, the sodium carbonate accelerator is introduced into the foam/concrete mixture and mixed. Typically, the sodium carbonate is added at a percentage of approximately 0.1–15% of the weight of cement used in the mix, and more preferably, at about 0.5–3% by weight of cement used. Following addition of the accelerator, the mixture is then allowed to cure.

Figure 2:
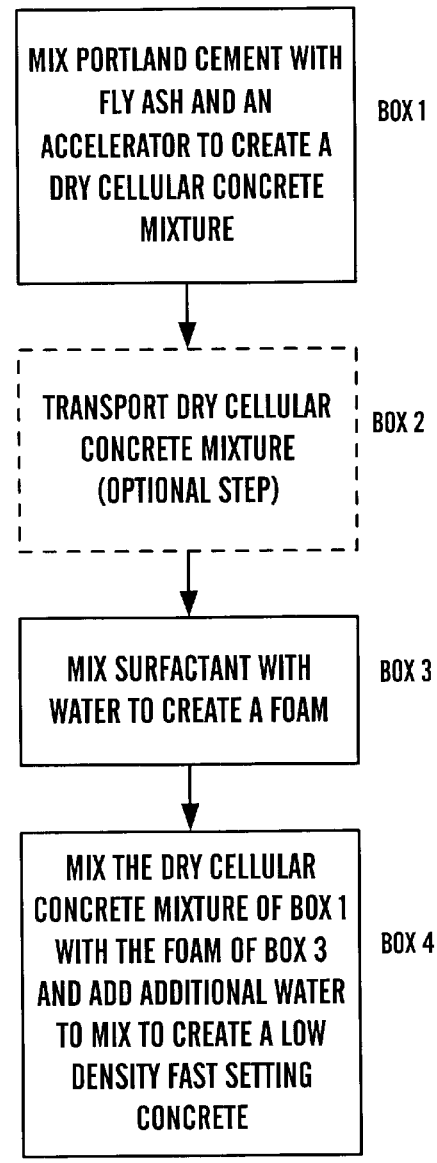

A second method for producing a light weight cellular concrete in presented in FIG. 2. The first step, as depicted in Box 1, consists of blending a mix of the dry ingredients to create a dry cellular concrete mixture. Thus, the first step consists of weighing and blending the fly ash, cement and accelerator. The second required step, as shown in Box 3, consists of creating a foam using a mechanical mixer or compressed air to blend water with a surfactant. As shown in Box 4, a modified volumetric mixer may subsequently be used to introduce water and pre-formed aqueous foam into the mix to produce the final product. Prior to mixing the dry materials created in Box 1 with the liquid components of Box 4, the dry cellular concrete mixture of Box 1 may be transported to a different location, as shown in Box 2. The dashed lines of Box 2 denote that this is an optional step. Such different locations may include storage locations where the dry mix is stored prior to shipment to a construction site, or alternately, the dry mix may be shipped directly to a construction site.

As shown in the following examples, the viscosity of the mixture increases rapidly, and the mixture becomes incapable of flowing within minutes after introducing the accelerator, entraining air bubbles within the slurry. The following experiments were conducted which show the unique properties of the cellular concrete using accelerators such as sodium bicarbonate (baking soda) and sodium carbonate.

Note, "total % by weight" as used herein is the percent of the subject component in the total (or final) mix on a weight basis. The total (or final) mix as just referenced is the mix that exists just after the last component is added to create the final product that will cure and become a light weight cellular concrete.

Experiment #1

2–3% Accelerator (by Weight of Cement Used)

All materials were at a room temperature of approximately 70° F.

Cement Paste

| | |
|---|---|
| Mixed | 200 ml. (185 gram) of tap water |
| With | 600 ml. (600 gram) of type 1 ASTM C-150 Portland cement |

Mixed medium speed with drill with paint mixing wand for 1 min. until completely mixed. Total volume was 600 ml.

Foam

| | |
|---|---|
| Mixed | 100 ml. (96 gram) of tap water |
| With | 3 ml. (3 gram) of Surfonic SF 95 a non-ionic surfactant |

Mixed high speed with drill with paint mixing wand for 1 min. until completely mixed.

Total volume was 1500 ml.

Within 1 min.

Added foam to cement paste while mixing at low speed with paint mixing wand for 1 min.

Total volume was 1750 ml.

| | |
|---|---|
| Cube #1 | 2 each |
| Mixed | 12 ml. (12 gram) of sodium bicarbonate accelerator (2% by weight of cement used: 0.02 × 600 gm (cement) = 12 gm sodium bicarbonate accelerator) |

Mixed at low speed with drill with -paint mixing wand for 15 sec. until completely mixed.

Immediately poured into 2 in. by 2 in. brass cube mold and left undisturbed, uncovered at room temperature for 10 hours. Removed cubes from mold.

The material set up in 2 min. as to not flow out of a 16 oz cup when inverted.

Cube #1 Mix Summary

Cement—66.96 total % by weight

Water—31.36 total % by weight

Surfactant—0.34 total % by weight

Accelerator—1.34 total % by weight (2% by weight of cement used)

| Cube #2 | 1 each |
|---|---|
| Mixed | 18 ml. (18 gram) of sodium carbonate accelerator (3% by weight of cement used: 0.03 × 600 gm (cement) = 18 gm sodium carbonate accelerator) |

Mixed at low speed with drill with paint mixing wand for 15 sec. until completely mixed.

Immediately poured into 2 in. by 2 in. brass cube mold and left undisturbed, uncovered at room temperature for 10 hours. Removed cubes from mold.

The material set up in 1 min. as to not flow out of a 16 oz cup when inverted.

Cube #2 Mix Summary

Cement—66.52 total % by weight

Water—31.15 total % by weight

Surfactant—0.33 total % by weight

Accelerator—2.00 total % by weight (3% by weight of cement used)

Compression tests at an independent test lab revealed the following results after 12 hrs: Cube #1 32.5 psi., and Cube #2 55.0 psi. After 7 days, Cube #1 had a compression strength of 207 psi.

Experiment #2

Mix with Retarder

All material were at room temperature, i.e. 72° F.

Cement Paste

| Mixed | 450 ml. (445 gram) of tap water |
|---|---|
| With | 20 ml. of a gluconate retarder |
| With | 750 ml. (750 gram) of type 1 ASTM C-150 Portland cement |

Mixed medium speed with drill with paint mixing wand for 1 min. until completely mixed.

Total volume was 750 ml.

Stirred mix every 10 min. for 1 hour

Foam

| Mixed | 100 ml. (96 gram) of tap water |
|---|---|
| With | 3 ml. (3 gram) of Tergitol NP9 surfactant |

Mixed high speed with drill with paint mixing wand for 1 min. until completely mixed.

Total volume was 1500 ml.

Within 1 min., added foam to cement paste while mixing at low speed with paint mixing wand for 1 min.

Total volume was 1750 ml.

| Cube #1 | 2 each |
|---|---|
| Mixed | 4 ml. (4 gram) of sodium carbonate accelerator (0.5% by weight of cement used: 0.005 × 750 gm (cement) = 4 gm sodium carbonate accelerator) |

Mixed at low speed with drill with paint mixing wand for 15 sec. until completely mixed.

Immediately poured into 2 in. by 2 in. brass cube mold and left undisturbed, and uncovered at room temperature for 12 hours. Removed cubes from mold.

The material set up in 2 min. as to not flow out of a 16 oz cup when inverted.

Compression tests conducted at an independent lab revealed the following results:

After 24 hrs

| Cube #1 | 163 psi. |
|---|---|
| Cube #2 | 113 psi. |
| Cube #3 | 150 psi. |

Experiment #3

4% Accelerator (by Weight of Cement Used)

All materials were at room temperature, i.e. 72° F.

Prepare Cement Paste

| Mixed | 250 ml. (240 gram) of tap water |
|---|---|
| With | 750 ml. (750 gram) of type 1 ASTM C-150 Portland cement |

Mixed at medium speed with a handheld drill with a paint mixing wand for 1 min., until completely mixed.

Total volume was 750 ml.

Within 1 min. added foam to cement paste while mixing at low speed with paint mixing wand for 1 min.

Foam

| Mixed | 100 ml (96 gram) of tap water |
|---|---|
| With | 3 ml (3 gram) of Surfonic SF 95, a non-ionic surfactant. |

Mixed high speed with drill with paint mixing wand for 1 min. until completely mixed.

Total volume was 1500 ml.

Within 1 min. added foam to cement paste while mixing at low speed with paint mixing wand for 1 min.

Total volume was 1750 ml.

Within 1 min.

Mixed 30 ml. (30 gram) of sodium bicarbonate accelerator (4% by weight of cement used: 0.04×750 gm (cement)= 30 gm sodium bicarbonate accelerator)

Mixed at low speed with drill with paint mixing wand for 15 sec. until completely mixed.

Immediately poured into 2 in. by 2 in. brass cube mold and left undisturbed, uncovered at room temperature for 10 hours. Removed cubes from mold.

The material set up in 30 seconds as to not flow out of a 16 oz cup when inverted.

An independent testing lab did the compression test with the following results:

After 12 hours:

Cube #1 was 67.5 psi.

After 18 hrs:

Cube #1 was 127.5 psi.

Experiment #4

Flyash Mix with 10% Accelerator (by Weight of Cement Used)

All materials were at room temperature, i.e. 72° F.

Cement Paste

| Mixed | 300 ml. (285 gram) of tap water |
|---|---|
| With | 3 drops of super-plastisizer STSP 198 Shotcrete Technologies (water reducing agent) |
| Added | 600 ml. (600 gram) of type 1 ASTM C-150 Portland cement |

Added 150 ml. of type c flyash
Mixed medium speed with drill with paint mixing wand for 1 min. until completely mixed.
Total volume was 750 ml.
Foam

| Mixed | 100 ml. (96 gram) of tap water |
|---|---|
| With | 3 ml. (3 gram) of Surfonic SF 95, a non-ionic surfactant. |

Mixed high speed with drill with paint mixing wand for 1 min. until completely mixed
Total volume was 1500 ml.
Within 1 min. added foam to cement paste while mixing at low speed with paint mixing wand for 1 min.
Total volume was 1750 ml.
Within 1 min.
Mixed 60 ml. (60 gram) of sodium carbonate accelerator (10% by weight of cement used: 0.10×600 gm (cement)=60 gm sodium carbonate accelerator).
Mixed at low speed with drill with paint mixing wand for 15 sec. until completely mixed.
Immediately poured into 2 in. by 2 in. brass cube mold and left undisturbed, uncovered at room temperature for 10 hours. Removed cubes from mold.
The material set up in 15 seconds as to not flow out of a 16 oz cup when inverted.
An independent testing lab did the compression test with the results as follows:
After 12 hrs:
Cube #1=75 psi.
After 24 hrs:
Cube #1=100 psi.

Experiment #5

4% Accelerator (by Weight of Cement Used)

All materials were at room temperature, i.e. 72° F.
Cement Paste

| Mixed | 200 ml. (185 gram) tap water |
|---|---|
| With | 600 ml. (600 gram) type 1 ASTM C-150 Portland cement |

Mixed medium speed with drill with paint mixing wand for 1 min. until completely mixed
Total volume was 699 ml.
Foam

| Mixed | 100 ml. (96 gram) of tap water |
|---|---|
| With | 3 ml. (3 gram) of Surfonic SF 95, a non-ionic surfactant. |

Mixed high speed with drill with paint mixing wand for 1 min. until completely mixed Total volume was 1750 ml.
Within 1 min. added foam to cement paste while mixing at low speed with paint mixing wand for 1 min.
Within 1 min. mixed 24 ml. (24 gram) of sodium carbonate accelerator (4% by weight of cement used: 0.04×600 gm (cement)=24 gm sodium carbonate accelerator)
Mixed at low speed with drill with paint mixing wand for 15 sec. until completely mixed.
Immediately poured mixture into 2 in. by 2 in. brass cube mold and left undisturbed, uncovered at room temperature for 10 hours. Removed cubes from mold.
The material set up in 30 seconds as to not flow out of a 16 oz cup when inverted. An independent test lab confirmed the following compression tests:
After 12 hrs.
Cube #1 tested at 60 psi.

Experiment #6

At 70 deg. F.
Cement, type f DSI fly ash and accelerator are blended dry. The dry blend is fed through a volumetric screw mixer and injected with water calibrated to 48% by dry weight. Celcore Inc. preformed aqueous foam was then injected to produce a cellular concrete with a wet density of 37 and a dry density of 33.5 pounds per cubic foot. The material was then pumped through 25 feet of 1-¼ inch grout hose. Samples were then taken using 3-inch by 6-inch test cylinders. The compressive strengths were 150 psi in 7 days 200 psi in 14 days and 250 psi in 28 days.
Material Per Cubic Yard

| 427 lb | Type 1-2 Portland Cement ASTM C-150 |
|---|---|
| 214 lb | Type F DSI Fly Ash |
| 2 lb 2 oz | Accelerator |
| 204 lb | Water |
| 70 lb | Celcore Inc. Preformed Foam |

The foaming agent made to Celcore Inc. specifications is mixed with water at 40 parts water to 1 part foaming agent by weight. The Celcore Inc foam generator was then calibrated to produce aqueous foam at 3.5 pounds per cubic foot.
The change in viscosity was noticed on all mixes.
Some mixes incorporated various fibers ie: nylon monofil fibrillated.
Some mixes incorporated perlite vermiculite fumed silica.
Some mixes used commercially available foams protein and chemical.
Accelerator in the amount of 0.5% by weight of cement used appears to be an ideal amount.
The dry blend cement fly ash and accelerator was mixed with wet soils and caused the soils to dry and stabilize.
It is anticipated that it is possible to inject dry accelerator in the volumetric screw mixer with a twin concave screw injector. Further, that it is possible to inject dry accelerator in the hose near the placement point with a twin concave screw injector to have a more controlled acceleration.
What is claimed is:
1. A cellular concrete composition, comprising in total % by weight:
   a) 15–68 lime cement;
   b) 20–42 water;
   c) 0.1–1.0 non-ionic surfactant foaming agent;
   d) 0.01–10 sodium carbonate as an accelerator; and
   e) 12–65 fly ash;
wherein said composition has a compressive strength of at least 32 psi after a cure period of about 12 hours at a temperature of about 70–72 degrees Fahrenheit.

2. The composition as claimed in claim 1, further comprising a superplasticizer.

3. The composition as claimed in claim 1, further comprising silica.

4. The composition as claimed in claim 1, further comprising nylon monofil fibrillated fibers.

5. The composition as claimed in claim 1, further comprising about 1.5% by weight gluconate retarder.

6. A rapid set concrete composition comprising in total % by weight:
   a) a Portland cement in the amount of 50 to 68;
   b) a water in the amount of 30 to 41;
   c) a non-ionic surfactant in the amount of 0.2 to 0.4;
   d) a sodium carbonate accelerator in the amount of 0.3 to,6.0; and
   e) a fly ash in the amount of 12 to 19.5.

7. The composition as claimed in claim 6, further comprising a superplasticizer.

8. The composition as claimed in claim 6, further comprising nylon monofil fibrillated fibers.

9. The composition as claimed in claim 6, further comprising about 1.5% by weight gluconate retarder.

10. The composition as claimed in claim 6, wherein said composition has a compressive strength of at least 32 psi after a cure period of about 12 hours at a temperature of about 70–72 degrees Fahrenheit.

11. A rapid set concrete which maintains a substantially constant viscosity during hardening, comprising in % total by weight:
    a) a Portland cement in the amount of 12–68;
    b) a type f fly ash in the amount of 12–50;
    c) a water in the amount of 30–45;
    d) a non-ionic surfactant in the amount of 0.01.–0.33; and,
    e) a sodium carbonate accelerator in the amount of 0.05–6;
wherein said concrete has a density of less than about 55 pounds per cubic foot after curing.

12. The composition as claimed in claim 11, further comprising a superplasticizer.

13. The composition as claimed in claim 11, further comprising fumed silica.

14. The composition as claimed in claim 11, further comprising about 1.5% by weight gluconate retarder.

15. The composition as claimed in claim 11, wherein said composition has a compressive strength of at least 32 psi after a cure period of about 12 hours at a temperature of about 70–72 degrees Fahrenheit.

16. A method for making a cellular concrete with a density of less than about 60 pounds per cubic foot, comprising the steps of:
    a) mixing 12–68 total % by weight of a lime cement with 12–50 total % by weight of a fly ash with 20–34 total % by weight of water to create a liquid cement mixture;
    b) mixing 0.01–0.33 total % by weight of a non-ionic surfactant with 7–11 total % by weight of water to create a foam;
    c) mixing said liquid cement mixture with said foam to create a low density liquid concrete; and,
    d) mixing 0.05–6 total % by weight of dry sodium carbonate accelerator with said low density liquid concrete to increase the viscosity of said low density liquid concrete.

17. The method of claim 16, wherein said low density liquid concrete initially sets within 10 minutes of introducing said accelerator.

18. A method of making a rapid-set low density cellular concrete with a density of less than about 55 pounds per cubic foot, comprising the steps of:
    a) mixing a cement in the amount of 12–75 total % by weight, with a fly ash in the amount of 12–75 total % by weight, and a sodium carbonate or sodium bicarbonate accelerator in the amount of 0.3–3.5 % by weight of said cement used, to create a dry cellular concrete mixture;
    b) mixing a non-ionic surfactant in the amount of 0.1–0.5 total % by weight, with water in the amount of 1–12 total % by weight, to create a foam; and
    c) mixing said dry cellular concrete mixture with additional water in the amount of 15–50 total % by weight with said foam to create a low density liquid concrete that rapidly sets to become said rapid-set low density cellular concrete.

19. The method as claimed in claim 18, herein said fly ash is a byproduct of burning coal.

20. The method as claimed in claim 18, wherein said fly ash is Type F DSI or FGD fly ash.

* * * * *

UNITED STATES PATENT AND TRADEMARK OFFICE
CERTIFICATE OF CORRECTION

PATENT NO. : 6,485,561 B1  Page 1 of 1
DATED : November 26, 2002
INVENTOR(S) : Dattel It is certified that error appears in the above-identified patent and that said Letters Patent is hereby corrected as shown below:

Column 9,
Line 4, please add the word -- fumed -- before the word "silica".
Line 15, please omit the comma "," before the number "6.0."

Column 10,
Line 40, please correct the word "herein" to read as -- wherein --.

Signed and Sealed this

Eighth Day of April, 2003

JAMES E. ROGAN
*Director of the United States Patent and Trademark Office*